US011301487B1

United States Patent
Kumar et al.

(10) Patent No.: US 11,301,487 B1
(45) Date of Patent: Apr. 12, 2022

(54) AUTOMATED SERVER DISCOVERY

(71) Applicant: EMC IP Holding Company LLC, Hopkinton, MA (US)

(72) Inventors: Sunil Kumar, Bangalore (IN); Vinay Rao, Bangalore (IN); Boaz Michaely, Newton Center, MA (US); Arieh Don, Newton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 760 days.

(21) Appl. No.: 15/656,286

(22) Filed: Jul. 21, 2017

(51) Int. Cl.
*G06F 16/27* (2019.01)
*G06F 9/455* (2018.01)
*G06F 16/22* (2019.01)
*H04L 67/01* (2022.01)
*H04L 61/5007* (2022.01)

(52) U.S. Cl.
CPC .......... *G06F 16/27* (2019.01); *G06F 9/45558* (2013.01); *G06F 16/2237* (2019.01); *G06F 2009/45583* (2013.01); *G06F 2009/45595* (2013.01); *H04L 61/2007* (2013.01); *H04L 67/42* (2013.01)

(58) Field of Classification Search
CPC .. G06F 16/27; G06F 16/2237; G06F 9/45558; G06F 2009/45583; G06F 2009/45595; H04L 61/2007; H04L 67/42
See application file for complete search history.

(56) References Cited

U.S. PATENT DOCUMENTS

| | | | | |
|---|---|---|---|---|
| 8,825,919 B1* | 9/2014 | Lim | .................. | H04L 41/22 710/15 |
| 8,972,987 B2* | 3/2015 | Ciano | ................. | G06F 9/45533 718/1 |
| 9,880,757 B1* | 1/2018 | Banerjee | ................. | G06F 3/067 |
| 2014/0040410 A1* | 2/2014 | McDowell | ............ | G06F 3/0617 709/212 |
| 2014/0181044 A1* | 6/2014 | Pawar | ................. | G06F 11/1484 707/654 |
| 2014/0181810 A1* | 6/2014 | Lvovsky | ............. | G06F 9/44505 718/1 |
| 2015/0227602 A1* | 8/2015 | Ramu | ..................... | G06F 16/27 707/634 |
| 2015/0234611 A1* | 8/2015 | Mutalik | .............. | G06F 11/1446 711/114 |
| 2017/0132044 A1* | 5/2017 | Kaneko | .................... | G06F 3/061 |
| 2018/0287912 A1* | 10/2018 | Zabarsky | ................ | G06F 3/067 |

* cited by examiner

*Primary Examiner* — Mark D Featherstone
*Assistant Examiner* — Samuel C Sharpless, III
(74) *Attorney, Agent, or Firm* — Workman Nydegger

(57) ABSTRACT

In one example, a method involves performing an initial discovery process that includes querying a storage array, and identifying, based on the query, one or more hosts that are registered with the storage array. This initial discovery process is performed automatically without requiring user action to identify the one or more hosts. The method additionally includes presenting a list of discovered hosts, receiving a selection input from a user specifying one or more of the hosts in the list, retrieving, from the storage array, information associated with each of the respective hosts, and making the information available to a user.

19 Claims, 2 Drawing Sheets

AUTOMATED SERVER DISCOVERY

FIELD OF THE INVENTION

Example embodiments of the invention relate to systems and methods for managing data. More particularly, at least some embodiments of the invention relate to systems and methods for performing copy or replication management of applications/data in a computing system.

BACKGROUND

Computing systems are an integral part everyday life. Users, businesses and other entities rely on computing systems and applications to perform a multitude of different functions. Computing systems are important, in part, because of the data stored in the computing systems. Airlines, for example, rely on the data in their computing systems in a multitude of ways, including allowing customers to make and manage reservations. Business, individuals, and other entities use computing systems and applications in one form or another and, in each case, those applications and data are important to the operations of the enterprise.

In some instances, an enterprise may need several different copies of an application, or a database. Each copy of the application or database may relate to a different use case of the enterprise. For example, such use cases may include backup, archiving, Governance-Risk-Compliance (GRC) preservation, testing and development, operations, and analytics. The various copies of the applications and databases can reside locally at the enterprise and/or at a cloud storage platform.

In recognition of the need for multiple copies of applications and databases, various copy data management (CDM) applications and platforms have been developed. In general, such applications and platforms enable a user to create and manage multiple copies of the various applications and databases needed by the enterprise for its operations.

In order to implement their functionality, a CDM platform needs to know the identity of the various hosts where the applications that are to be managed by the CDM reside. In particular, the hosts must be registered with the CDM in order to enable the CDM to communicate with the hosts to effect management of the applications by the CDM. Typically, registration of the hosts requires the user to manually enter the names and credentials of the hosts into the CDM.

However, manual registration of hosts may take a significant amount of time in environments where, for example, there are hundreds of hosts and/or virtual machines (VM) attached to a storage array that is employed in CDM processes. In such environments, each of the hosts and/or VMs must be manually registered by a user. Moreover, the use of such manual processes, particularly where a large number of hosts is involved, increases the likelihood that input errors will occur which could compromise, or completely impair, CDM processes.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
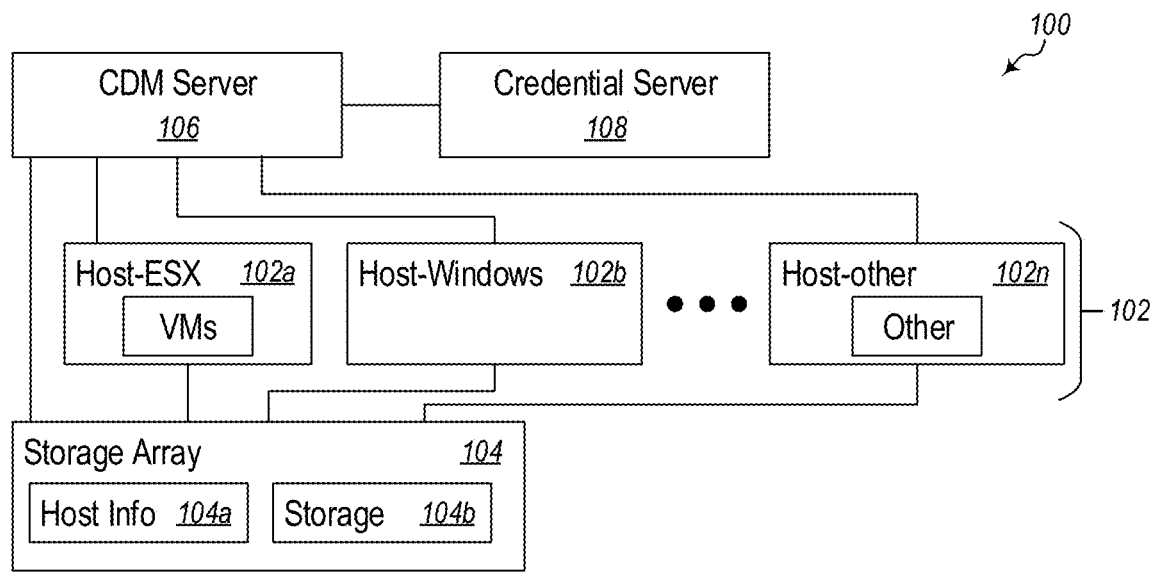
FIG. 1 illustrates an example of an operating environment in which host registration and automated server discovery may be performed.

Example embodiments of the invention generally relate to systems and methods for managing data. More particularly, at least some embodiments of the invention concern systems, hardware, software, computer-readable media, and methods directed to copy data management. Among other things, the copy data management functionality provided in connection with example embodiments of the invention employs automated server discovery and thus eliminates the need for manual host registry. That is, such embodiments are able to automatically detect the host(s) that have, or need, the applications and/or data that is managed by a CDM system. As such, embodiments of the invention embrace CDM systems that implement this automatic host detection functionality. Among other things, this approach to host detection eliminates the need for a user to manually enter host information, such as IP addresses and credentials, into a CDM system or CDM server.

A. Example Operating Environment

The following is a discussion of aspects of example operating environments for various embodiments of the invention. This discussion is not intended to limit the scope of the invention, or the applicability of the embodiments, in any way.

In general, embodiments of the invention may include and/or be implemented in connection with a storage environment which may comprise, or consist of, a storage array. The storage environment can take various forms, including a cloud storage environment, an on-premises storage environment, or a hybrid storage environment that includes public and private elements, although the scope of the invention is not limited to any particular type of storage environment.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

With reference now to FIG. 1, details are provided concerning aspects of an operating environment for at least some embodiments of the invention, one example of which is denoted generally at 100. In general, various copy data management (CDM) operations, among others, can performed in the operating environment 100. Such operations may include, for example, protection, replication, and cloning, of databases and applications. Other example operations are addressed below.

The operating environment 100 may include any number of host devices 102, such as host devices 102a, 102b ... 102n, that each host one or more applications and/or databases used by a tenant or customer of the storage environment. As such, a particular tenant may employ, or otherwise be associated with, one or more instances of each of one or more applications. In general, the applications are not limited to any particular functionality or type of functionality. Some example applications include email applications such as MS Exchange, database applications such as SQL Server, filesystems, and datastores. One example of an application that may be used to manage application copies, and in which the functionality disclosed herein can be employed, is EMC AppSync.

The hosts 102 are not required to have any particular configuration, and a variety of different hosts 102 may be present in any particular operating environment 100. In the example of FIG. 1, host 102a takes the form of a Dell-EMC ESX server. The host 102b is a server that includes a Windows operating system (OS) and Microsoft Multipath I/O (MPIO) which is able to dynamically detect and configure storage devices. Applications with functionality comparable to that of MPIO are referred to generally herein as multipath detection and configuration applications. Finally, the host 102n can be any other type of host, and is not limited to any particular OS. Regardless of its configuration however, each of the hosts 102 includes an MDC. As further indicated in FIG. 1, one, some, or all, of the hosts 102 may include one or more virtual machines (VM) that each include one or more applications that generate and/or modify data that is desired to be protected and, as such, the hosts 102 may also be referred to as production hosts. As indicated with host 102n, one or more of the hosts 102 can additionally, or alternatively, include devices and machines other than VMs.

In addition to the hosts 102, the example operating environment 100 also includes a storage array 104 that is configured to communicate with the hosts 102. In general, the various applications operating on the hosts 102 generate new and/or modified data that can be locally stored on or by the host 102, and backed up to the storage array 104. Likewise, datastores and databases associated with the hosts 102 can include data that is protected by the storage array 104. As shown, the storage array 104 can store host information 104a, and includes data storage 104b.

As further indicated in FIG. 1, the operating environment includes a copy data management (CDM) server 106 that hosts a CDM application. In some particular embodiments, the CDM application is the DELL-EMC AppSync application, and the CDM server 106 is an AppSync server. This particular embodiment is provided only by way of example however, and is not intended to limit the scope of the invention in any way.

The CDM server 106, which can communicate with the hosts 102 and the storage array 104, provides CDM services to the hosts 102, particularly, to the applications and datastores of VMs and/or other devices residing at the hosts 102. As such, and by way of example, copies of such applications and datastores may be stored in the storage array 104. The CDM application can provide a variety of different management functions, such as protection, replication, and cloning, of databases and applications, such as the databases and applications running on the VMs and/or other devices resident on the hosts 102. Other example management functions performed by, or at the direction of, the CDM application include, but are not limited to, managing the copies stored in the storage array 104, generating new copies, issuing commands necessary in the context of replication management, performing restore operations, launching copies for reasons other than production, such as analytics, and research, for example.

Finally, the example operating environment 100 includes a credential server 108 that communicates with the CDM server 106. In general, the credential server 108 stores credentials for the hosts 102. Further details concerning host credentials are discussed below.

B. Example Host Configuration

Figure 2:
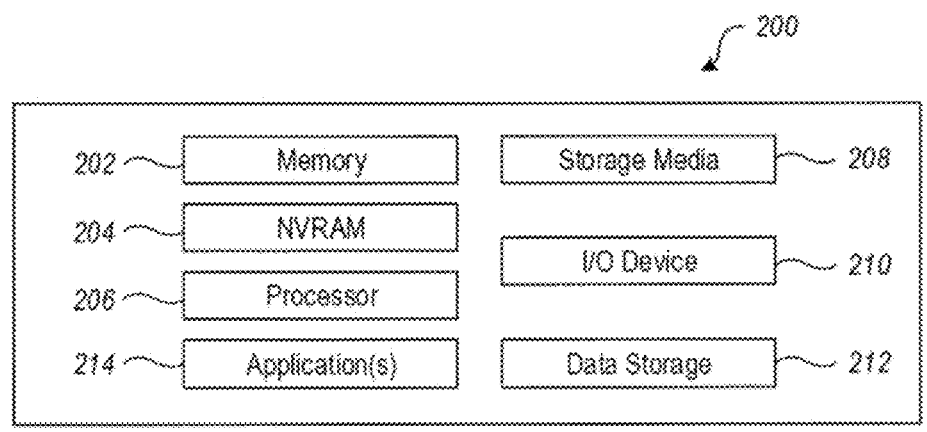
FIG. 2 discloses aspects of an example physical computing device configuration.

Turning briefly now to FIG. 2, any one or more of the hosts 102, storage array 104 (and associated storage devices), CDM server 106, and credential server 108 can take the form of a physical computing device, one example of which is denoted at 200. In the example of FIG. 2, the physical computing device 200 includes a memory 202 which can include one, some, or all, of random access memory (RAM), non-volatile random access memory (NVRAM) 204, read-only memory (ROM), and persistent memory, one or more hardware processors 206, non-transitory storage media 208, I/O device 210, and data storage 212. One or more of the memory components of the physical computing device can take the form of solid state device (SSD) storage. As well, one or more applications 214 are provided that comprise executable instructions. Such executable instructions can take various forms including, for example, a copy data management (CDM) application, applications and databases/datastores that run on a VM and may be managed by a copy management application, a multipath detection and configuration (MDC) application, and an automated server discovery (ASD) application. Examples of such applications and agents are disclosed herein. Further details concerning these example applications and agents are disclosed elsewhere herein.

C. Aspects of Example Use Cases

With continued reference now to FIG. 1, details are now provided concerning some example host configurations, system operations, and various use cases. In general, and as also noted elsewhere herein, embodiments of the invention are concerned with enabling a CDM server to automatically detect hosts connected to a storage array so that the CDM server and associated CDM application can communicate with, and provide CDM services to, one or more of those hosts. Due to the complexity of operating environments, and the wide variety of possible host configurations, a number of different use cases are contemplated within the scope of the present invention. Moreover, it will be appreciated that various elements or features of multiple different use cases may be combined together to define still further use cases, which are also considered to be within the scope of the present invention. For example, and with reference to FIG. 1, an ESX server such as host 102a may employ MPIO, such as is used by host 102b.

Use Case 1

The first use case concerns the example in which a host, such as the host 102b for example, includes one or more VMs and is running a multipath detection and configuration (MDC) application, one example of which is MPIO. In this use case, and some others, the host registers itself with the storage array, rather than being registered with the storage array by another entity.

More particularly, host/MDC registration commands are used by the host to send information about the host to the storage array, and the host information is stored at the storage array. Such host information may include, but is not limited to, the name and version of the operating system (OS) that is running on the host, the host name, the host IP address, the number of VMs on the host, cluster information, vendor information, VM unique identifiers, and any other information concerning the host.

In some instances at least, the MDC will also detect, if possible, the applications and/or application types that are running on VMs resident at the host. Examples of such applications and application types include, but are not limited to, Oracle (database), MS Exchange (email), and SQL (database). The MDC can perform this detection in various ways, such as by analyzing the names of the processes running on the host, for example.

Once the host registration information has been collected, it may be sent to the storage array by the MDC, and the storage array can then accept and store the host registration information. In some embodiments at least, the storage array includes a table in which the host registration information is stored. The aforementioned processes can be performed for a single host, or for multiple hosts. In this way, the storage array automatically becomes aware of the identity and configuration of the host(s) that is/are connected to it. The credentials of each host are not stored at the storage array.

In any use case where a host registers itself, that host may re-register itself on a recurring basis, and on its own initiative. For example, the table in the storage array is updated each time a host re-registers itself. The CDM server can then readily identify all the hosts connected to the storage array simply by reading the table of the storage array. The CDM can also respond to a user command to obtain, from each storage array, the registration table for that storage array. In this way, the CDM can identify all the registered hosts for each of a plurality of storage arrays.

As well, in any use case where a host registers itself, that host may re-register itself using an alternative approach to that just described. In particular, in this alternative approach, the host re-registers itself, but does so in response to a command rather than on its own initiative. For example, the CDM can receive a user command for each host to re-register itself. The CDM can then send a command on one or more storage arrays, ordering that each registered host associated with a respective storage array re-register itself. In this example, the hosts are polling the storage array to identify any new commands directed to the host(s), such as a command to re-register with the storage array. This polling can take place on a relatively frequent basis, such as about once per minute, for example. Any new commands can be contained in a host-specific bitmap that is returned by the storage array to the host in response to the poll. In more detail, when the storage array receives the command from the CDM to tell the hosts to re-register, the storage array will set an appropriate bit in the commands bitmap read by each host so that when the host gets the bitmap, the host will become aware that it needs to re-register and will then re-register. In some instances at least, the CDM can broadcast to all hosts by instructing each storage array to set the re-register bit in all host bitmaps.

As is apparent from the aforementioned examples, there are at least two different mechanisms the enable a user to request a fresh registration of hosts. When re-registration is completed, the CDM can query the hosts connected to each storage array.

Use Case 2

The second use case concerns a host that takes the form of a server, such as the DELL-EMC ESX server for example, that include one or more VMs and is running a multipath detection and configuration (MDC) application, one example of which is MPIO. In this use case, the host registers itself with the storage array, rather than being registered with the storage array by another entity. In this use case, which may be referred to as the raw device mode (RDM), the host registration process may be similar to the process employed in Use Case 1, except as noted.

In more detail, the host is configured to create an environment in which one or more VMs can be spawned. When reading and writing data, the VMs access an actual storage array disk, rather than accessing a VM logical volume. This is the RDM. For registration however, the VMs do not access the storage array. Rather, each of the VMs on the host sends its registration information to the host OS, such as Windows for example. The host OS then relays the VM registration information for its VMs to the storage array. In this use case, the VMs are not aware of each other, or of other entities. Instead, the VMs communicate only with OS of the server where they reside.

Use Case 3

In this use case, the VMs of a host are registered by another entity and do not self-register. In particular, an MDC, such as MPIO for example, performs registration of the host VMs. This use case may involve the use of a filesystem such as the VMware Filesystem (VMFS), although no particular filesystem is required to be employed. In contrast with the RDM use case, the VMs in the present use case are unaware of the location of their data. Rather, the VMs send reads/writes to the host, such as an ESX server for example, and the host relays the reads/writes to the VMFS. The VMFS, in turn, communicates with logical volumes of the storage array to implement the read and write operations requested by the VMs.

Since the VMs do not communicate with the storage array, the MDC handles registration of the host VMs with the storage array. More particularly, the MDC queries each of the VMs for its registration information, and then relays the registration information to the storage array.

Use Case 4

This use case concerns a host, such as an ESX server for example, that does not have an MDC, such as MPIO, installed. Instead, a management tool such as the VMware vCenter is used to manage communications between the host(s) and the storage array. The MDC runs on the vCenter ESX in this use case.

In this use case, each host includes multiple VMs, each with its own OS, which may be Windows, Linux, or any other OS. Simply for the purposes of illustration, a computing system might include 100 servers, each with 8 VMs, giving a total of 800 instances of the OS. As this example illustrates, there is a need for management capabilities, such as can be provided by tools such as vCenter. More specifically, the management tool can obtain registration information from the host VMs and then communicate that information to the storage array. This registration information can include, in addition to the other example registration information disclosed herein, VM storage logical unit number (LUN) information. The LUN information may concern, for example virtual machine disks (VMDK) and/or raw devices. The LUN is a unique identifier that designates an individual, or collection of, physical or virtual storage devices that execute input/output (I/O) commands with a host computer, such as an ESX server for example. VMDK is a file format that describes containers for virtual hard disk drives used in VMs.

Use Case 5

In general, this use case involves the masking of one or more devices of a storage array from a host, or group of hosts. Where masking is implemented, a particular host may only be permitted to communicate with certain devices at the storage array and, likewise, a device at the storage array may only be permitted to communicate with a particular host, or group of hosts.

In terms of a configuration where this use case may be employed, a logical connection, or zone, is established between the ports of one or more hosts and a port of the storage array. The logical connection can be implemented in a switch, such as a Fibre Channel (FC) switch for example. The logical connection and porting define one or more communication channels between a host and storage devices of the storage array. In this way, storage devices of the storage array can be masked from one or more particular hosts.

By way of illustration, a zone can be established that connects two hosts with a single storage array port. Each of the hosts in this example can communicate with 100 storage devices of the storage array. Particularly, the first host can communicate with storage devices 1-100, and the second host can communicate with storage devices 101-200. However, the storage devices 101-200 cannot communicate with the first host, and the storage devices 1-100 cannot communicate with the second host. Thus, in this example, various storage devices of the storage array are masked from one or the other of the two hosts.

Except for the masking process, the gathering and transmission of host registration information to the storage array in this use case can be performed similarly, or identically, to the processes specified in any of the other disclosed use cases, such as Use Case 1 for example. The storage array will then store the registered host information and the storage devices associated with each host/VMs, that is, the storage device(s) masked to each such host/VM.

D. Aspects of Example Methods

Figure 3:
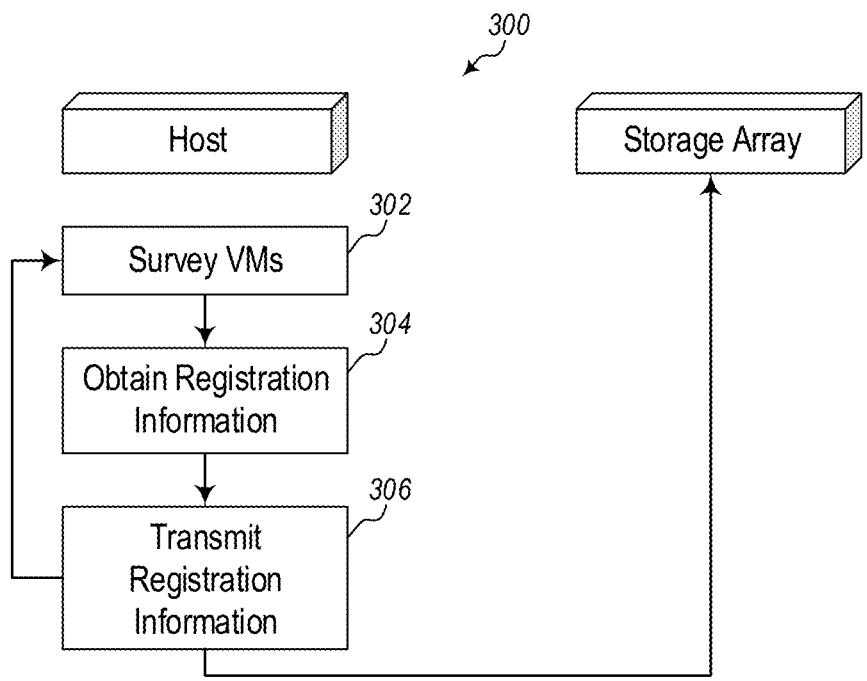
FIG. 3 is a flow diagram illustrating aspects of an example method for host registration at a storage array.

With attention now to FIG. 3, details are provided concerning some example methods directed to host registration at a storage array, where one example of such a method is denoted generally at 300. The method 300 can be performed in an operating environment such as the example operating environment 100 in FIG. 1, although no particular operating environment is necessarily required. Part, or all, of the method 300 can be performed using host/MDC registration commands. The method 300 is provided only by way of example, and as noted in the various use cases disclosed herein, there are a variety of approaches that can be taken with respect to host/VM registration.

The method 300 can begin when a host performs a survey 302 of its VMs. In general, the survey identifies the VMs running on that host. As noted elsewhere herein, the applications may be identified by analyzing the names of processes that are running on the host. In general, the information gathered during the survey 302 may enable a CDM server to perform various copy data management processes, examples of which are disclosed herein.

Once the survey is performed 302, the registration information for one or more of the VMs can be obtained 304. Information obtained 304 as a result of the survey 302 concerning the VMs can include VM unique identifiers, and applications running on the host VMs, such as Oracle, MS Exchange, and SQL. Host information may also be obtained 304 and may include information such as host OS name/version, cluster vendor, and cluster node number.

The registration information that has been identified and obtained can then be sent 306 to the storage array where the information is stored, such as in a table for example. In this way, the host/VMs are registered with the storage array. This registration, in turn, enables automated server discovery when a CDM server performs an automated discovery process involving the storage array. Example aspects of such a discovery process are discussed below in connection with FIG. 4.

Finally, and as indicated in FIG. 3, the host/VM registration process 300 can be performed recursively, although that is not required. That is, the host/VM registration process 300 can be repeated periodically, or on some other ongoing basis. As such, once the registration information is transmitted 306 to the storage array, the process 300 can return to 302 and begin again. One advantage of the recursive process is that it is able to accommodate changes that may occur over time in the operating environment, such as when a new VM comes online at the host performing the survey, or when a VM is removed from the host. A related advantage is that the records at the storage array are kept up to date with these changes.

Figure 4:
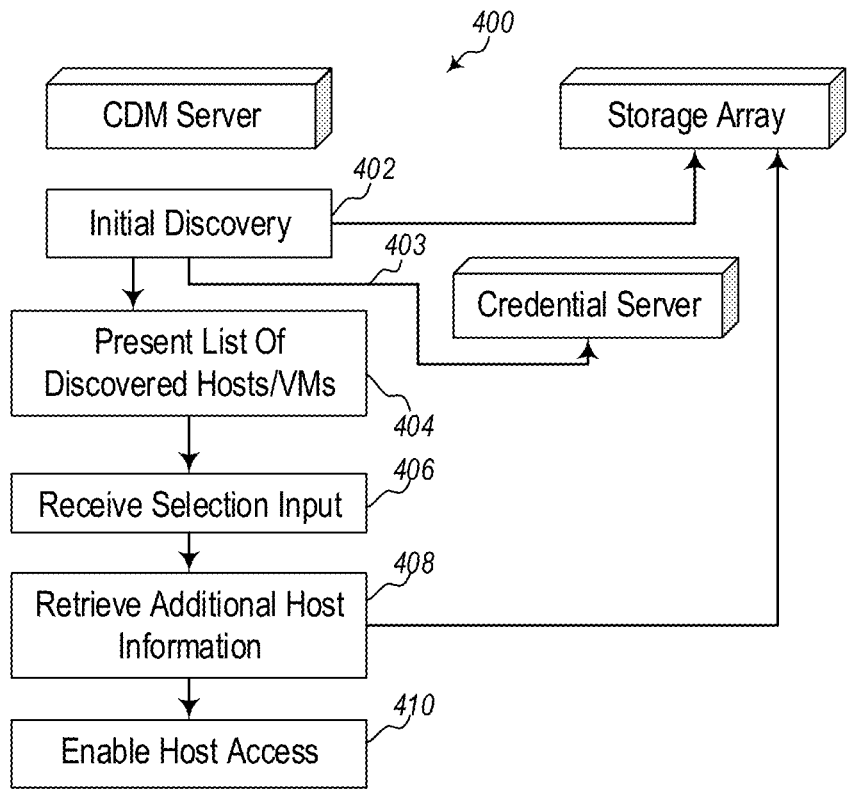
FIG. 4 is a flow diagram illustrating aspects of an example method for host registration at a storage array.

With attention now to FIG. 4, details are provided concerning some example methods directed to automated server discovery, where one example of such a method is denoted generally at 400. The method 400 can be performed in an operating environment such as the example operating environment 100 in FIG. 1, although no particular operating environment is necessarily required.

The method 400 begins when the CDM server performs an initial discovery 402 by reading all the relevant host/VM information from the array. The initial discovery can be performed automatically, whether on a recurring basis, a one-time, or an ad-hoc basis. In more detail, the initial discovery 402 may involve a query of the storage array for the list of hosts, such as ESX servers for example, and the relevant host VMs that are connected to the storage array. As should be apparent, discovery of the hosts/VMs registered with the storage array can thus be performed by the CDM server without requiring any affirmative inputs or other signals from a user, such as a CDM administrator.

As part of, or separately from, the initial discovery 402, the CDM server can obtain credentials 403 for the identified hosts from a credential server. In general, a user will not be permitted to manage a discovered server unless, or until, the user provides the host credentials for verification by the CDM server.

Next, the CDM server presents 404 a list of discovered hosts/VMs to a user, such as a CDM administrator for example. The list can be presented 404, for example, on any suitable display, GUI, or command line interface (CLI). The user can then select one or more hosts/VMs from the list in such a way that the CDM server receives 406 an input signal indicating the selection of one or more hosts/VMs from the list presented. Thus, the user is not required to manually register any of the hosts/VMs but, instead, simply selects hosts/VMs from a list that was generated based on an automatic server discovery process. In addition to providing selection input, the user must also provide credentials for each of the hosts that was selected. If the provided credentials match those obtained by the CDM server at 403, then the user will be permitted to manage the selected hosts. On the other hand, if the credentials provided by the user do not match those obtained by the CDM server at 403, or if no credentials are provided by the user, then the user will not be permitted to manage the selected hosts.

After receipt of the selection input 406, the CDM server then retrieves 408 from the storage array the rest of the information for each of the selected hosts. Such information may include, but is not limited to, host IP address, host name, and OS version on the host. This information is provided to the user and thus enables 410 the user to access the host for the purpose of copy data management processes.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
performing, by a copy data management (CDM) server, an initial discovery process to identify candidates for copy data management services which the CDM server is configured to provide, and the initial discovery process comprises:
querying a storage array; and
identifying, based on the query, one or more hosts that are registered with the storage array, wherein the initial discovery process is performed automatically by the CDM server without requiring user action to identify the one or more hosts, and the CDM server is configured to communicate with the one or more hosts;
presenting a list of automatically discovered hosts, and one of the automatically discovered hosts has, or needs, an application and/or data managed by the CDM server;
receiving a selection input from a user specifying one or more of the hosts in the list, and one of the hosts specified by the user is a target of a copy data management process;
retrieving, from the storage array, information associated with the hosts specified by the user as a target of the copy data management process, and the information enables the user to access that host and perform, or cause the performance of, the copy data management process on data and/or an application which that host has, or needs;
making the information available to a user; and
by the CDM server in response to a command from the user, accessing the specified host and performing the copy data management process on the data and/or the application that the specified host has, or needs.

2. The method as recited in claim 1, wherein identifying one or more hosts based on the query comprises identifying one or more virtual machines (VM) associated with an identified host, and one of the VMs is configured to run a multipath detection and configuration application operable to send information about that VM to the storage array.

3. The method as recited in claim 1, wherein identifying the one or more hosts comprises receiving, by the CDM server, a user command to obtain a registration table for the storage array, and the CDM server uses the registration table to identify all of the registered hosts for the storage array.

4. The method as recited in claim 1, wherein retrieving information from the storage array comprises retrieving any or more of a name and version of an operating system (OS) that is running on each host, the number of VMs on each host, a respective unique identifier for each VM, or any other information concerning the host.

5. The method as recited in claim 1, wherein performing the copy data management process comprises copying the data and/or application that the specified host has, or needs.

6. The method as recited in claim 1, further comprising acquiring credentials for one of the selected hosts, wherein the credentials are acquired from a source other than the storage array.

7. The method as recited in claim 6, wherein acquiring credentials for one of the selected hosts comprising receiving the credentials either from a credential server or from the user.

8. The method as recited in claim 1, further comprising sending, by the CDM server, a command to the storage array directing that hosts connected to the storage array re-register themselves with the storage array.

9. The method as recited in claim 1, further comprising performing, by the CDM server, a backup of an application or database resident at one of the hosts specified by the user.

10. A non-transitory storage medium having stored therein instructions which are executable by one or more hardware processors to perform operations comprising:
   performing, by a copy data management (CDM) server, an initial discovery process to identify candidates for copy data management services which the CDM server is configured to provide, and the initial discovery process comprises:
   querying a storage array; and
   identifying, based on the query, one or more hosts that are registered with the storage array, wherein the initial discovery process is performed automatically by the CDM server without requiring user action to identify the one or more hosts, and the CDM server is configured to communicate with the one or more hosts;
   presenting a list of automatically discovered hosts, and one of the automatically discovered hosts has, or needs, an application and/or data managed by the CDM server;
   receiving a selection input from a user specifying one or more of the hosts in the list, and one of the hosts specified by the user is a target of a copy data management process;
   retrieving, from the storage array, information associated with the hosts specified by the user as a target of the copy data management process, and the information enables the user to access that host and perform, or cause the performance of, the copy data management process on data and/or an application which that host has, or needs;
   making the information available to a user; and
   by the CDM server in response to a command from the user, accessing the specified host and performing the copy data management process on the data and/or the application that the specified host has, or needs.

11. The non-transitory storage medium as recited in claim 10, wherein identifying one or more hosts based on the query comprises identifying one or more virtual machines (VM) associated with an identified host, and one of the VMs is configured to run a multipath detection and configuration application operable to send information about that VM to the storage array.

12. The non-transitory storage medium as recited in claim 10, wherein identifying the one or more hosts comprises receiving, by the CDM server, a user command to obtain a registration table for the storage array, and the CDM server uses the registration table to identify all of the registered hosts for the storage array.

13. The non-transitory storage medium as recited in claim 10, wherein retrieving information from the storage array comprises retrieving any or more of a name and version of an operating system (OS) that is running on each host, the number of VMs on each host, a respective unique identifier for each VM, or any other information concerning the host.

14. The non-transitory storage medium as recited in claim 10, wherein performing the copy data management process comprises copying the data and/or application that the specified host has, or needs.

15. The non-transitory storage medium as recited in claim 10, wherein the operations further comprise acquiring credentials for one of the selected hosts, wherein the credentials are acquired from a source other than the storage array.

16. The non-transitory storage medium as recited in claim 15, wherein acquiring credentials for one of the selected hosts comprising receiving the credentials either from a credential server or from the user.

17. The non-transitory storage medium as recited in claim 10, wherein the operations further comprise sending, by the CDM server, a command to the storage array directing that hosts connected to the storage array re-register themselves with the storage array.

18. The non-transitory storage medium as recited in claim 10, wherein the operations further comprise performing, by the CDM server, a backup of an application or database resident at one of the hosts specified by the user.

19. A server comprising:
   one or more hardware processors; and
   the non-transitory storage medium as recited in claim 10.

* * * * *